United States Patent [19]

Colson

[11] Patent Number: 4,674,091
[45] Date of Patent: Jun. 16, 1987

[54] METHODS FOR TUNING FREE ELECTRON LASERS TO MULTIPLE WAVELENGTHS

[75] Inventor: William B. Colson, Berkeley, Calif.

[73] Assignee: The United States of America as represented by the Secretary of the Air Force, Washington, D.C.

[21] Appl. No.: 765,483

[22] Filed: Aug. 14, 1985

[51] Int. Cl.$^4$ .............................................. H01S 3/10
[52] U.S. Cl. ................................................... 372/20
[58] Field of Search .................................. 372/2, 5, 20

[56] References Cited

U.S. PATENT DOCUMENTS

| | | | |
|---|---|---|---|
| 3,822,410 | 7/1974 | Madey | 372/2 |
| 4,287,488 | 9/1981 | Brau et al. | 372/2 |
| 4,331,936 | 5/1982 | Schlesinger et al. | 372/2 |
| 4,345,329 | 8/1982 | Doucet et al. | 372/2 |
| 4,425,649 | 1/1984 | Elias et al. | 372/2 |

OTHER PUBLICATIONS

William B. Colson, "The Nonlinear Wave Equation for Higher Harmonics in Free-Electron Lasers" IEEE Journal of Quantum Electronics, vol. QE 17, No. 8, Aug. 1981.

Primary Examiner—Gene Wan
Attorney, Agent, or Firm—William G. Auton; Donald J. Singer

[57] ABSTRACT

The tuning of the output of a free electron laser to different wavelengths is accomplished using a tilting resonator. In a free electron laser, relativistic electrons travel through a periodic magnetic field and oscillate to amplify coherent optical radiation within a resonator with the same polarization as the magnet. Usually, the electron beam is parallel with the resonator axis and the fundamental harmonic is ordinarily used in the transverse magnetic field. By tilting the resonator axis with respect to the electron beam and transverse magnetic field, the free electron laser's output is tuned to different wavelengths. By using higher harmonics ($f = 3,5,7,\ldots$) the free electron laser produces lasing in several wavelengths simultaneously. These several wavelengths are also tuned by the tilting resonator.

9 Claims, 4 Drawing Figures

METHODS FOR TUNING FREE ELECTRON LASERS TO MULTIPLE WAVELENGTHS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to coherent radiation sources and specifically to the tuning of free electron lasers to different wavelengths.

Free electron lasers generate very high power pulses of coherent electromagnetic radiation by projecting a relativistic electron beam along the longitudinal axis of a drift tube where the beam interracts with a transverse, periodic magnetic field to amplify a superimposed optical wave.

The task of providing a free electron laser (FEL) which is tunable to different wavelengths is alleviated, to some degree, by the following U.S. patents, which are incorporated by reference:

U.S. Pat. No. 3,822,410 issued to Madey on July 2, 1974;
U.S. Pat. No. 4,287,488 issued to Brau et al on Sept. 1, 1981;
U.S. Pat. No. 4,331,936 issued to Schlesinger et al on May 25, 1982;
U.S. Pat. No. 4,345,329 issued to Doucet et al on Aug. 17, 1982; and
U.S. Pat. No. 4,425,649 issued to Elias et al on Jan. 10, 1984.

One example of a free electron laser is described in U.S. Pat. No. 3,822,410. This type of free electron laser operates on the principle of magnetic bremsstahlung wherein a periodic magnetic field is utilized to produce radiation. Other types of free electron lasers, more commonly referred to as the Smith-Purcell and Cerenkov lasers are described in a publication by Gover et al entitled "Operation Regimes of Cerenkov-Smith-Purcell Free Electron Lasers and R.W. Amplifiers," Optics Communications, Vol. 26, No. 3, September 1978, pp. 375-380. In these devices a slow electromagnetic wave structure and periodic waveguide is used to facilitate the interaction of the electron beam and the electromagnetic wave.

However, even with these apparent different physical principles, both the magnetic bremsstrahlung and the Cerenkov-Smith-Purcell laser have similar gain expressions, similar wave dispersion equations and similar operation regimes. The main difference between the magnetic bremsstrahlung and the Cerenkov-Smith-Purcell lasers is that the magnetic bremsstrahlung laser involves transverse modulation of the electron beam by the transverse periodic force, while the Cerenkov-Smith-Purcell lasers involve direct longitudinal modulation of the electron beam by the longitudinal component of the electric field of the electromagnetic wave. Nevertheless, the interaction between the electron beam and the electromagnetic wave is carried out through longitudinal modulation of the electron beam which is created by the ponderomotive force-effect.

Since this is a second or third order effect in the fields, the interaction between the electromagnetic wave and the electron beam in the magnetic bremsstrahlung free electron laser is much weaker than the interaction in the Smith-Purcell-Cerenkov lasers (which are first order effects). Therefore, in principle, one of the differences between the magnetic bremsstrahlung free electron laser and the Smith-Purcell-Cerenkov lasers is that the latter devices can provide higher gain.

Another difference between magnetic bremsstrahlung laser and Smith-Purcell-Cerenkov lasers is in the interaction region width, which affects the power and efficiency of the device. In this aspect the difference is in favor of the magnetic bremsstrahlung free electron laser.

Unfortunately, both types of free electron lasers, as described hereinabove, contain drawbacks which affect both the efficiency and the overall reliability of their operation. In addition to the drawbacks presented above, the above-mentioned lasers also tend to be large and bulky as well as being difficult to tune. Consequently, there remains a void in the area of free-electron lasers which needs to be filled.

SUMMARY OF THE INVENTION

The present invention disclosure describes a free-electron laser having a novel method of tuning. Basically the resonator section of the laser comprises two end mirrors, and a magnet. The resonator length (L) is somewhat greater than the magnet length (L) and the resonator is canted off-axis to the selected wavelength. That is, the electron beam is off-centered from the optical axis. In this manner tuning the FEL optical wavelength is achieved by rotating the resonator axis with respect to the magnet and the electron beam axis. Also, by this method lasing simultaneously in several wavelengths using higher harmonics is achieved.

It is therefore an object of this invention to provide a new and improved method of tuning free electron lasers.

It is another object of the present invention to provide a free electron laser which is tuned to different wavelengths by the variation of the resonator axis with the electron beam axis.

It is another object of the present invention to tune free electron lasers with a variation of the harmonic number of radiation, using higher harmonics for both tuning the laser, and lasing at several wavelengths simultaneously.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a method of tuning a free electron laser to different wavelengths.

Figure 1:
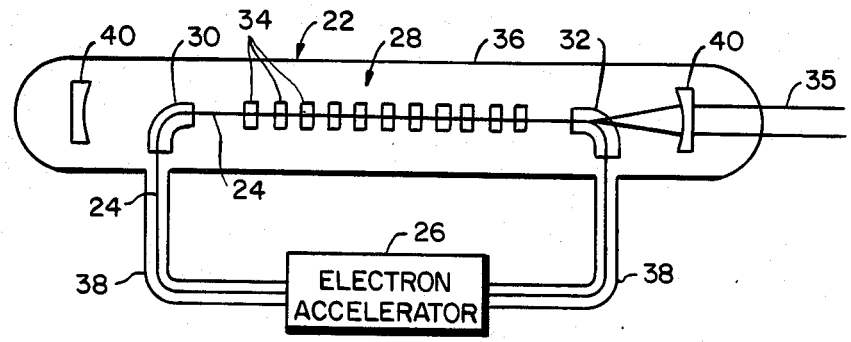
FIG. 1 is a schematic diagram of a prior art free electron laser.

The reader's attention is now directed towards FIG. 1, which depicts the prior art free electron laser from the Madey reference. As mentioned earlier, this type of free electron laser operates on the principal of magnetic bremsstrahlung in which a periodic magnetic field is utilized to produce radiation. Lasing occurs when the electron beam 24 from the accelerator 26 is injected into the periodic magnetic array 28. Oscillations result from the stimulated emission of radiation by the electron beam 24 as it passes through the magnetic field due to photons that are emitted into the optical modes of the resonator by the two mirrors 40.

Usually, one of the mirrors 40 is a partial mirror while the other is a 100% mirror. The optical waves may bounce back or forth between the mirrors until they build up into a coherent and monochromatic laser oscillation at an optical frequency as the electron beam and transverse magnetic field amplifies them.

Figure 2A:
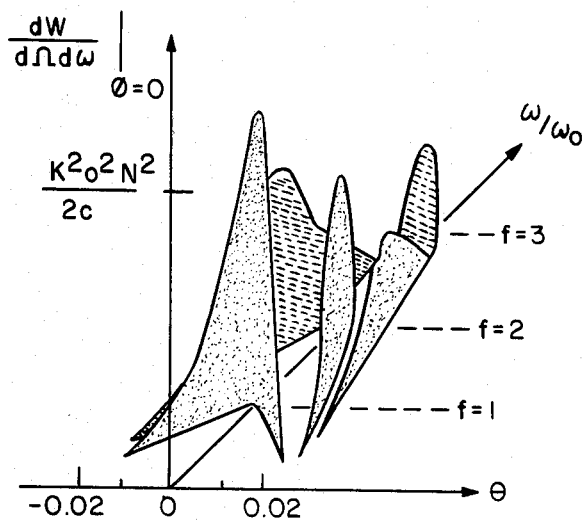
FIGS. 2a and 2b are charts respectively depicting the fields of a linearly polarized magnet and a helical magnet.
Figure 2B:
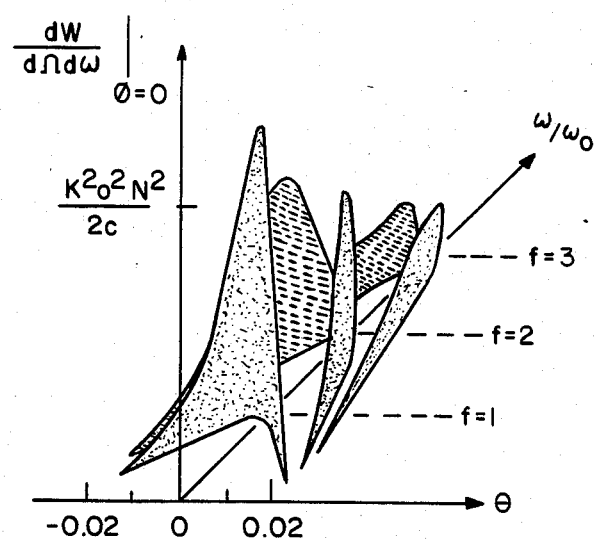

In all previous free electron lasers, as depicted in FIG. 1, attempts are made to align the magnet's axis, electron beam, and laser beam. The present invention is distinct from the prior art methods, in that the tuning of the free electron laser to multiple wavelengths is accomplished by rotating the resonator axis with respect to the magnet and the electron beam axis. The tunable character comes from the resonance relationship $$\lambda = \lambda_o(1 - \beta_z \cos\theta)/f \tag{1}$$

where $\lambda$ is the optical wavelength, $\lambda_o$ is the magnet wavelength, $\beta_z c$ is the electron z—velocity, z being the vector along the resonator axis, $\theta$ is the angle between the propagation directions of the electron beam and light wave in the interaction region, and f is the harmonic number of the radiation (f = 1,2,3, . . .). The electron energy $\gamma mc^2$ is related to $\beta_z$ by $\beta_z = \sqrt{1-(1+K^2)/\gamma^2}$ for a helical magnet design; $k^2$ is replaced with a $(\frac{1}{2})K^2$ in all equations in this text for a linearly polarized magnet. Here $K = eB\lambda_o/2\pi mc^2$ where $e \equiv |e|$ is the electron change, B is the peak magnetic field strength, m is the electron charge, and c is the speed of light. When $K \gtrsim 1$, there will be spontaneous emission into a few higher harmonics. See FIGS. 2a and 2b for the emission from a linearly polarized magnet (a) and a circularly polarized magnet (b).

Usually $\theta = 0$ and f = 1 is considered the optimum design for free electron lasers; this produces the shortest possible optical wavelength in the fundamental and maximized the interaction. Here we propose generalizing the angular relationship of the electron and light beams and also using higher harmonics to achieve a useful advantage in tuning the laser and even lasing at several wavelengths simultaneously.

Typically, FEL's use large and emit into a narrow range of angles so that (1) may be rewritten $$\lambda \simeq \frac{\lambda_o}{2f\gamma^2}(1 + K^2 + \gamma^2\theta^2) \tag{2}$$

as seen in FIG. 2 the wavelength of the radiation increases as $\theta$ increases; also the radiation intensity decreases as $\theta$ approaches $\gamma^{-1}$. In the oscillator configuration, some of the spontaneous radiation is stored between the mirrors of an optical resonator; this light acts back on subsequent electrons entering the resonator to cause stimulated emission. When sufficient radiation is built up in the resonator, stimulated emission (minus stimulated absorption) exceeds the spontaneous emission rate to produce gain. An important parameter in achieving maximum gain is $v = L[fk_o - K(1-\beta_z \cos\theta)]$ where $k = 2\pi/\lambda$, $k_o = 2\pi/\lambda_o$ and $L = N\lambda_o$ is the periodic magnet length; it is desirable that $v \simeq 2.6$ when the laser is starging. Usually, $\gamma$ (and hence $\beta_z$), $k_o$, and L are fixed with $\theta = 0$, so that $\lambda = 2\pi/k$ adjusts itself to maximum gain by means of mode competition. But with $\theta \neq 0$, $\lambda$ can be adjusted for a fixed electron energy:

$$\lambda = \lambda_o(1 + (\frac{1}{2})K^2 + \gamma^2\theta^2)/2\gamma^2 f(1 - 2.6/2\pi N). \tag{3}$$

Figure 3:
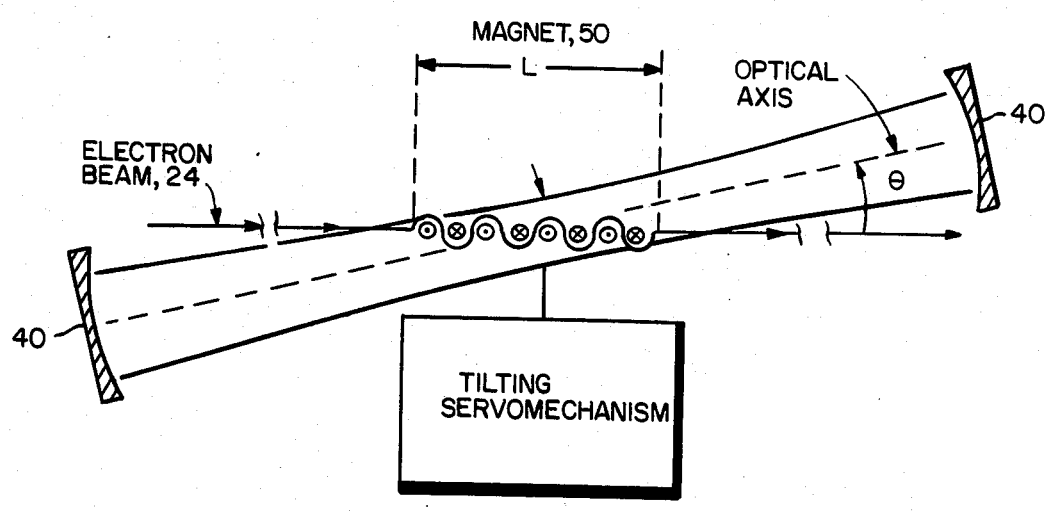
FIG. 3 is an illustration of the preferred embodiment of the present invention.

FIG. 3 is an illustration depicting the preferred embodiment of the present invention. The fixed magnet 50 continues to produce a transverse magnetic field on the electron beam 24. However, the resonator, which contains the two end mirrors 40 with the optical waves bouncing back and forth between them, is counted off-axis by a servomechanism 100 with respect to the magnet 50 and the electron beam 24 to select the desired wavelength.

The wavelengths of light are selected by incrementally adjusting $\theta$, the angle between the electron beam and the optical path of the waves between the mirrors. Therefore, the area of each mirror should be comparatively small so that the range of angles collected actually selects a small range of wavelengths. A typical resonator length is $10^3$ cm and $\gamma = 10^2$, so that a mirror of 0.5 cm diameter would select a x2 range in wavelengths while moving through a 10 cm range off-axis. Fine position adjustments can be made with a micrometer.

An important practical consideration is whether or not the electron beam can stay within the misaligned optical mode area. As the resonator is canted off-axis, the light and electron beams must remain coupled. The necessary relationship is:

$$\theta \gtrsim \sqrt{2} \; W_0/L \tag{4}$$

where:

$\pi W_0^2$ is the optical mode area at the beam waist;

$\theta$ is the angle between the electron beam and the optical path of the light between the two mirrors; and L is the length of the magnet.

Typically, this is related to the resonator length L: $\pi W^2_0 = L\lambda/2$. So, the available range of tuning angles is $\theta \gtrsim (L\lambda/\pi L^2)^{\frac{1}{2}}$; as $\theta$ increases to reach longer wavelengths, the mode area increases to aid coupling. $\gamma\theta$ is confined to quite a small tunable range if complete coupling is desited from a long (N large) periodic magnet:

$$\frac{\gamma^2\theta^2}{(1 + \frac{1}{2}K^2 + \gamma^2\theta^2)} \gtrsim \frac{(/L)}{2\pi N f} \tag{5}$$

is greater than L, but usually only a few times greater in laboratory cases. To improve the situation, one can use shorter magnets ($N \approx 10$), longer resonators ($L \approx 10$ L), or not require complete coupling when tuning far off-axis. A high gain FEL could operate without complete coupling.

Even though the tunable range in Equation 5 may be small, it is usually many times broader than the narrow laser line-width and also compares favorably with the tunable range of atomic lasers.

While angular tuning can reach longer optical wavelengths, higher harmonics can be used to reach shorter wavelengths. In Volume QE-17, No. 8 of the Journal of Quantum Electronics the inventor, in an article entitled "The Nonlinear Wave Qauntum for Higher Harmonics in Free-Electron Lasers", describes how laser gain and spontaneous emission is produced by linearly polarized magnets in the odd harmonics f=1,3,5. . . . While the idea of lasing in harmonics has been put forth much earlier, the useful concept proposed here is to achieve laser action in more than one harmonic simultaneously. Mirrors could be made to store radiation from both the fundamental (f=1) and the f=3rd harmonic and absorb other radiation; laser feedback would bunch the electron beam on two scales $\lambda$ and $\lambda/3$. Bunching at harmonics does not destroy the long range order of the beam necessary for coherence.

This would provide a laser source emitting two distinct wavelengths simultaneously. The energy for both beams would come from the shared electron beam in the periodic magnet. Industrial or scientific application may often require several wavelengths to achieve a desired photochemical result. The present invention can produce several wavelengths for different users, and allows these several wavelengths to be tuned by rotating the resonator axis with respect to the electron beam axis and transverse magnetic field.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In ccmbination with a free electron laser which has a resonator with a resonator axis formed by the mirrors which face each other and have optical waves bouncing back and forth between them along an optical path, linearly polarized magnets producing a transverse, periodic magnetic field which extends into the resonator, and an accelerator which injects a relativistic electron beam along an electron beam path through the transverse, periodic electric field in the resonator to oscillate and amplify the optical waves in a stimulated emission of radiation to produce a coherent and monochromatic laser oscillation at an optical wavelength having a polarization which is the same as that of the transverse magnetic field, the specific improvement comprising a process of tuning the laser oscillation to different wavelengths by a rotation of the resonator axis with respect to the electron beam path and the transverse periodic magnetic field.

2. A process of tuning laser oscillations to different wavelengths, as defined in claim 1, wherein said rotation comprises:
tilting the resonator axis at an angle of $\theta$ between the electron beam and transverse magnetic field to produce the laser oscillation at a selected wavelength $\lambda$, said selected wavelength being given by $$\lambda = \lambda_o(1 - B_z\cos\theta)/f$$

where:
$\lambda$ equals the selected wavelength;
$\lambda_o$ is a magnetic wavelength of the transverse magnetic field;
$\beta_z c$ is electron velocity along the optical path axis; and
f equals a harmonic number for said selected wavelength produced by the linearly polarized magnets.

3. A process of tuning laser oscillations to different wavelengths, as defined in claim 2, wherein said process includes lasing at one selected wavelength by setting said harmonic number (f) at a value equal to 1 so that a fundamental harmonic is used in stimulated emission of radiation.

4. A process of tuning laser oscillations to different wavelengths, as defined in claim 2, wherein said process includes lasing in several wavelengths simultaneously by using higher harmonics of said transverse magnetic field together with the electron beam to oscillate the optical waves into several wavelengths simultaneously, the several wavelengths being tuned by the rotation of the resonator axis with respect to the electron beam and transverse magnetic field.

5. A process of tuning laser oscillations to different wavelengths, as defined in claim 4, wherein said higher harmonics are harmonic numbers (f) selected from the series consisting of: (f=3,5,7,9. . .).

6. A free electron laser comprising:
a means for accelerating electrons, said accelerating means emitting a relativistic electron beam in a path forming an electron beam axis;
fixed, linearly polarized magnets which produce a periodic, transverse magnetic field through which the electron beam from the accelerating means is passed; and
a tilting resonator having a resonator axis between two mirrors, with one of the mirrors at each end of the resonator and with optical waves bouncing back and forth along an optical path between the two mirrors, said tilting resonator producing monochromatic laser oscillations which are tuned to different wavelengths when the resonator axis is tilted with respect to the electron beam axis which enters the tilting resonator and together with the transverse magnetic field oscillators the optical waves into the monochromatic laser oscillations.

7. A free electron laser, as defined in claim 6, wherein said tilting resonator tilts the optical path at an angle of $\theta$ between the electron beam axis and the transverse magnetic field to produce the laser oscillations at a selected wavelength $\lambda$, said selected wavelength being given by $$\lambda = \lambda_o(1 - B_z\cos\theta)/f$$

where:
$\lambda$ equals the selected wavelength;
$\lambda_o$ is a magnetic wavelength of the transverse magnetic field;
$\beta_z c$ is electron velocity along the optical path axis; and
f equals a harmonic number for said selected wavelength produced by the linearly polarized magnets.

8. A free electron laser, as defined in claim 7 wherein said harmonic number equals 1 so that a fundamental harmonic is used to produce a single laser oscillator which is tuned by the tilting resonator to different wavelengths.

9. A free electron laser, as defined in claim 7 wherein said harmonic number is selected from a series consisting of: (f=3,5,7,9. . .) thereby causing said transverse magnetic field to oscillate at higher harmonics and said free electron laser to produce lasing in several wavelengths simultaneously as the optical waves are oscillated with a same polarization as that of the transverse magnetic field, said several wavelengths being tuned as said tilting resonator tilts the resonator axis with respect to the electron beam axis and transverse magnetic field.

* * * * *